Nov. 26, 1957 E. W. SWEGLER 2,814,598
PROCESS FOR REACTIVATING A CRACKING CATALYST
Filed Feb. 5, 1954
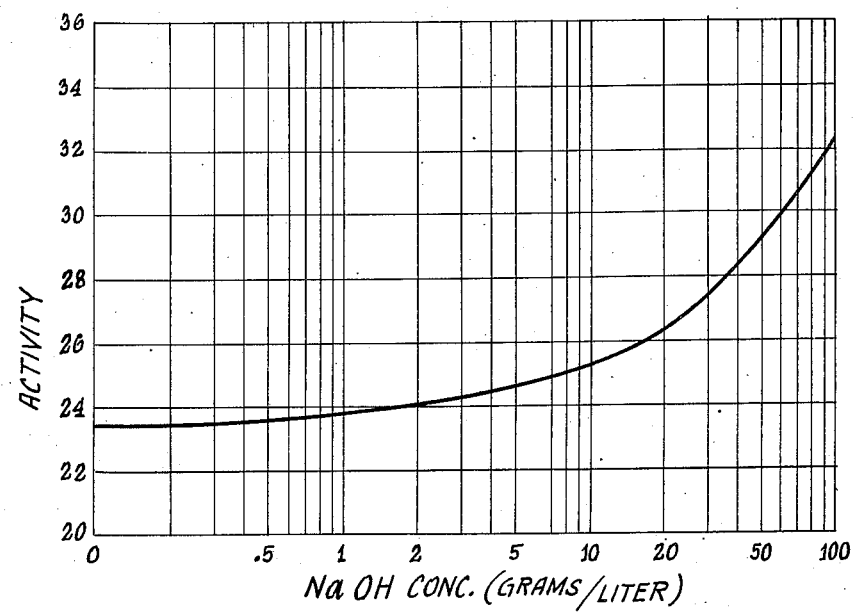
INVENTOR
Ernest W. Swegler
BY
Raymond W. Barclay
ATTORNEY

United States Patent Office 2,814,598
Patented Nov. 26, 1957

2,814,598

PROCESS FOR REACTIVATING A CRACKING CATALYST

Ernest W. Swegler, Woodbury, N. J., assignor to Socony Mobil Oil Company, Inc., a corporation of New York Application February 5, 1954, Serial No. 408,415

6 Claims. (Cl. 252—412)

This invention relates to a process for reactivating a catalytic composite useful in the conversion of higher boiling hydrocarbons to lower boiling hydrocarbons, such as gasoline. More particularly, the present invention is concerned with a method for reactivating siliceous cracking catalysts which have become deactivated during the course of cracking and regeneration operations.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In clays, the metal oxide present is principally alumina. Active synthetic cracking catalysts are generally gels or gelatinous precipitates and include silica-alumina, silica-zirconia, silica-beryllia, and silica-magnesia, as well as ternary combinations, such as silica-alumina-magnesia, silica-alumina-zirconia, and silica-alumina-beryllia. Ordinarily, this type of catalyst contains silica and at least one material selected from the group, alumina, zirconia, beryllia, and magnesia. Other metal oxides may also be present if desired, generally in small percentage, such as the oxides of manganese, chromium, titanium, tungsten, molybdenum, and calcium. Synthetic siliceous cracking catalysts may be prepared by well known methods, such as by cogelation or co-precipitation of the silica and metal oxide or by milling together the separately precipitated or gelled components. Alternatively, the metal oxide may be combined with a previously formed siliceous gel utilizing impregnation or base exchange techniques. The present invention, however, is not limited to catalysts prepared by any particular method but is of general application to siliceous cracking catalysts. It will thus be understood that the catalysts undergoing treatment in accordance with the present invention may be any of the siliceous cracking catalysts heretofore customarily employed which are susceptible to deactivation in operations involving alternate conversion of hydrocarbons and catalysts regeneration. It will further be understood that the reactivation treatment described herein is performed on catalysts which have previously been utilized for the conversion of hydrocarbons. Bothe the natural and synthetic cracking catalysts appear to be affected in generally the same manner and are considered substantially fully equivalent in undergoing the reactivation treatment of the present invention.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. The reaction which takes place is essentially a cracking to produce lighter hydrocarbons but is accompanied by a number of complex side reactions, such as aromatization, polymerization, alkylation, and the like. As a result of these complex reactions, a carbonaceous deposit is laid down on the catalyst commonly called "coke." The deposition of coke tends to seriously impair the catalytic efficiency of the catalyst for the principal reaction and the conversion reaction is thereafter suspended after coke to the extent that a few percent by weight of catalyst has accumulated on the catalyst. The catalytic surface is then regenerated by burning the coke in a stream of oxidizing gas and the catalyst is returned to the conversion stage of the cycle.

As the catalyst is carried through a large number of cycles of alternate conversion and regeneration, the activity following each regeneration becomes progressively less until the activity is too low for economical use of the catalyst. This change in activity after regeneration is ordinarily a slow change but may be accelerated by the presence of metal contaminants in the catalyst or in the hydrocarbon charge undergoing treatment. In ordinary operation a catalyst may be in service for a year or more before becoming so deactivated as to preclude further use thereof.

The commercial practice in the past has been to discard a deactivated hydrocarbon conversion catalyst and employ a fresh charge of new catalyst. Since such practice has been an expensive operation, various methods have heretofore been proposed for reactivating a siliceous cracking catalyst. The proposed methods, however, have not been economically feasible and none have received commercial adoption. By means of the present invention, the practice of discarding a deactivated hydrocarbon conversion catalyst can be substantially eliminated and the low activity catalyst renewed to approximately its original activity by a specified chemical treatment set forth herein. It is accordingly the principal object of this invention to rejuvenate a deactivated catalyst to a higher activity level and to afford a cracking catalyst capable of yielding a high gasoline/coke ratio upon reactivation thereof.

In accordance with the process of the invention, reactivation is effected by contacting the deactivated catalyst with a solution of an alkaline alkali metal compound having a pH sufficiently high to remove silica from the catalyst and subsequently replacing the alkali metal so introduced with a monovalent non-metallic ion. This is accomplished by soaking the deactivated catalyst in a solution of an alkaline alkali metal compound having a pH above 10 and preferably in the range of 12 to 15, thereafter base-exchanging the alkali treated catalyst with a solution containing monovalent non-metallic ions, for example, hydrogen or ammonium ions, to substantially completely remove alkali metal introduced during the aforementioned soaking and thereafter washing the catalyst free of said solution.

The catalyst undergoing treatment in accordance with the present process is a deactivated siliceous hydrocarbon conversion catalyst of the type described hereinabove. The catalyst may be either a naturally occurring composite, typified by an acid activated bentonite clay and fullers' earth or a synthetic siliceous gel composite. It has been found that the alkali metal introduced into such deactivated catalyst is base-exchangeable and that, upon subsequent treatment of the catalyst with a solution containing as its principal cation a monovalent non-metallic ion, the alkali metal so introduced is removed to yield a hydrocarbon conversion catalyst having a renewed activity.

After removal of the alkali metal introduced into the deactivated catalyst with a solution of monovalent non-metallic ions, such as an acid or ammonium salt solution, the catalyst is washed free of such solution, dried, and calcined. In a preferred embodiment of the invention, the resulting catalyst is subjected to mild steam treatment. The exposure of the treated catalyst to steam, as will appear from data set forth hereinafter, is a desirable step in affording a reactivated catalyst of improved gasoline/coke ratio. Steam treatment may be carried out at a temperature within the approximate range of 800° F.–1500° F. for at least about 2 hours. Usually steam at a treatment of about 1000° F. to 1300° F. will be used, with the treating period extending from about 2 to about 48 hours. Temperatures above 1500° F., and generally above 1300° F. for the clay catalysts, may be detrimental and should be avoided. Optimum improvement has been observed by treatment at 1100° F.–1200° F. for about 24 hours at atmospheric pressure in a 100 percent steam atmosphere. As long as critically high temperatures, which cause rapid shrinking or sintering of the catalyst, are avoided, longer periods of treatment than above designated apparently have no adverse effect. Also, an atmosphere consisting of a substantial amount of steam, say, at least about 10 percent by volume, but containing air or other gas substantially inert with respect to the composite being treated, may be used and such mixtures are, in fact, desirable with the use of the more elevated temperatures to avoid possible degeneration of the catalyst.

After the above-described treatment with alkaline alkali metal compound followed by removal of the alkali metal so introduced with a monovalent non-metallic ion and preferably subsequent steam treatment, the catalyst is in a reactivated state and may be returned to the conversion chamber of the cracking unit for further use in catalytically promoting the conversion of higher boiling hydrocarbons to hydrocarbons boiling in the range of gasoline.

In the following examples, the activity of the catalysts is designated in terms of the volume percent of gasoline obtained on cracking of a standard charge stock under conditions of the CAT–A method, described in National Petroleum News, Technical Section, August 2, 1944, beginning at page R537. In accordance with the described method, a light East Texas gas oil is contacted with the catalyst at a temperature of approximately 800° F. under superatmospheric pressure and at a liquid space rate of 1.5 (volume charge/volume of catalyst/per hour) for a ten-minute operation period. The volume of gasoline of 410° F. cut point is measured and expressed as a percentage of the volume of oil charged, thereby designating the characteristic activity of the catalyst. In addition, the quantity of coke deposited on the catalyst is also usually measured and expressed in terms of weight percent of charge and the specific gravity and weight percent of gas produced is also determined the following examples will serve to illustrate the process of the invention:

EXAMPLE 1

A siliceous cracking catalyst containing 90.85 percent $SiO_2$, 9 percent $Al_2O_3$, and 0.15 percent $Cr_2O_3$, having an initial activity of about 34, was utilized in a compact moving bed catalytic cracking unit over an extended period of time until the activity thereof had declined to 23.4. The catalyst at this stage was contaminated with 87 p. p. m. of nickel and 167 p. p. m. of vanadium. A volume of 250 cc. of this deactivated catalyst was soaked in 500 cc. of an aqueous solution containing 100 grams/liter of NaOH for a period of 72 hours at room temperature. The solution was then drained from the catalyst and the catalyst was water-washed free of caustic. The catalyst was then placed in 500 cc. of an aqueous solution containing 100 grams/liter of $NH_4NO_3$ for 24 hours. The catalyst was drained, water-washed, and then immersed in a fresh 500 cc. volume of the same solution for another 24 hours, then drained again, water-washed, and given a third treatment with the ammonium nitrate solution for a similar period of time. After a total ammonium nitrate treating period of 72 hours, the catalyst was water-washed until the pH of the wash water was 7–8. The catalyst was then dried in air at about 130° C. for 2 hours and then slowly heated in air to 538° C. for approximately 3 hours. The activity of the reactivated catalyst was 32.4.

In other examples carried out in accordance with the procedure of Example 1, the deactivated cracking catalyst was initially treated with caustic solution of varying concentration. The effect of caustic concentration on the resulting catalytic properties determined by CAT–A testing is shown in Table I below:

Table I

| Example | NaOH concentration (grams/liter) | Gas gravity | Coke | Activity | Bulk density |
|---|---|---|---|---|---|
| 1 | 100 | 1.35 | 2.0 | 32.4 | .68 |
| 2 | 60 | 1.39 | 2.0 | 29.9 | .72 |
| 3 | 20 | 1.34 | 1.8 | 26.4 | .76 |
| 4 | 8 | 1.29 | 1.7 | 24.6 | .76 |
| 5 | 2 | 1.29 | 1.7 | 24.6 | .77 |

The above data are presented graphically in the single figure of the drawing attached hereto. From the presented data, it will be seen that, while some increase in activity was achieved with dilute NaOH solutions, an NaOH concentration of at least about 10 grams/liter was required to afford substantial reactivation. It is contemplated that the concentrations of alkali metal hydroxide may range from about 1 percent up to about 25 percent by weight. In general, a solution of alkali metal hydroxide at a concentration of 5 to 10 percent by weight is preferred for purposes of the invention. While the preferred time of soaking in alkali metal hydroxide solution is a substantial period of time, i. e., 24 hours or longer, improvement in activity of the treated catalyst will result from soaking times of 1 hour or more. Generally, the time of soaking will depend on the concentration of alkali metal hydroxide solution employed and, at the preferred concentrations set forth hereinabove, the time of soaking is preferably in the range of from 3 to 72 hours.

Improvement in the gasoline to coke ratio has been obtained by subjecting the activated catalyst to a steam-aging treatment. The following examples illustrate the improvement in gasoline to coke ratio achieved by subjecting the activated catalyst to a subsequent steam treatment:

EXAMPLE 6

The deactivated catalyst of Example 1 was treated in accordance with the method described therein, employing a sodium hydroxide concentration of 90 grams/liter. The catalyst, after being so treated and treated with ammonium nitrate solution as described in Example 1, was tested for CAT–A characteristics and the following results were obtained:

Activity _____ 30.4
Coke _____ 2.4
Gas gravity _____ 1.40

The above catalyst was subjected to treatment with 100 percent steam at 1100° F. for 24 hours. The CAT–A characteristics of the steam-treated catalyst were:

Activity _____ 28.2
Coke _____ 1.1
Gas gravity _____ 1.43

Thus, steam-aging the NaOH-treated catalyst at 1100° F. reduced the activity only 2 A. I. points but decreased the coke make very markedly, the overall gasoline/coke ratio rising, as a result of steam treatment, from 12.6 to 25.6.

EXAMPLE 7

A sample of the deactivated catalyst of Example 1 was treated as described in such example by using an NaOH solution of 90 grams/liter. The catalyst, after being so treated and contacted with ammonium nitrate solution as described in Example 1 showed, upon testing, the following CAT-A results:

Activity _____ 29.9
Coke _____ 2.4
Gas gravity _____ 1.37

The above-activated catalyst was treated for 24 hours at 1200° F. in 100 percent steam and, upon testing, showed the following CAT-A results:

Activity _____ 24.3
Coke _____ 0.8
Gas gravity _____ 1.41

In this example, the overall gasoline/coke ratio was increased by the steam-treating step from 12.4 to 30.3.

EXAMPLE 8

A catalyst having the composition and initial activity set forth in Example 1 was employed in the catalytic cracking of gas oil over an extended period of time until the activity thereof had decreased to 24.8. This catalyst differed from that of Example 1 in that it was not contaminated with metals. A 250 cc. sample of the deactivated catalyst was treated in accordance with the procedure of Example 1, employing an NaOH concentration of 100 grams/liter. The CAT-A activity of the reactivated catalyst was 31.1.

A comparison of three different solutions used as exchange media for effecting removal of sodium from the catalyst after treatment with sodium hydroxide is shown in the following examples:

EXAMPLES 9-11

Three identical 250 cc. (191 grams) batches of the deactivated catalyst of Example 1 were each soaked in 500 cc. of NaOH solution of 100 grams/liter concentration for 24 hours. The solutions were then decanted and the catalyst was washed with distilled water. Each batch was immersed in a different one of the following three aqueuos solutions containing identical gram atom concentrations of different cations:

(1) $NH_4NO_3$, 100 grams/liter
(2) $Al_2(SO_4)_3 \cdot 18H_2O$, 416 grams/liter
(3) $HNO_3$ (specific gravity=1.422), 80 cc./liter After soaking for 24 hours, the solutions were poured off and 500 cc. of an identical fresh solution were added to each of the three batches. The solutions were renewed again after another 24 hours. After a total exchange time of 72 hours, the catalyst batches were drained and water-washed free of soluble material. The catalysts were then dried at 130° C. in air for approximately 16 hours and for 3 hours in air at 538° C. The three batches were then subjected to CAT-A testing with the following results:

|  | CAT-A test results | | |
| --- | --- | --- | --- |
|  | $NH_4NO_3$ batch | $Al_2(SO_4)_3$ batch | $HNO_3$ batch |
| Gas gravity | 1.27 | 1.44 | 1.36 |
| Gas, wt. percent | 5.7 | 11.4 | 10.4 |
| Coke, wt. percent | 1.7 | 3.4 | 2.8 |
| Activity (vol. percent gasoline) | 29.0 | 36.5 | 35.6 |
| Gasoline/coke ratio | 17.1 | 10.7 | 12.7 |

From the above comparative data, it will be noted that the use, as an exchange medium for the sodium, of a solution of a polyvalent metal ion, typified by aluminum, did not afford the resultant reactivated catalyst characterized by the high gasoline/coke ratio such as attained with solutions of monovalent non-metallic ions, typified by the hydrogen ions of the nitric acid solution and the ammonium ions of the ammonium nitrate solution. It is evident that the non-metallic monovalent $H^+$ ions and $NH_4^+$ ions afforded improved reactivating results over the polyvalent $Al^{+++}$ ions with the best overall results being achieved with the $NH_4^+$ ions. Since the latter are removed during subsequent drying of the catalyst, it is also apparent that its is unnecessary to add any ion to the catalyst after the described treatment with alkali metal hydroxide in order to obtain effective restoration of activity but, rather, efficient removal of the introduced alkali metal ion from the catalyst would appear to be essential in attaining the desired reactivation.

Upon treatment of the deactivated siliceous cracking catalyst in accordance with the process described herein, a measurable loss of silica occurs with the use of alkali metal hydroxide solutions of higher concentration. Thus, the apparent density of the catalyst decreases from an initial density of .77 to .72 and to .66 using concentrations of NaOH of 60 grams/liter and 100 grams/liter, respectively, employing treating times of 72 hours. With shorter times of contact, the loss of silica is not sufficient to give a measurable density drop although a considerable increase in activity is obtained. Without being limited by any theory, it would appear that a new catalyst surface is exposed as a result of the silica-removing action of the alkali metal-containing solution of high pH on the catalyst, resulting in an alteration of the catalyst structure and accounting for the increase in catalytic activity. The subsequent treatment with ammonium or hydrogen ion-containing solution is not presumed to have any catalytic effect in and of itself but merely to remove the alkali metal introduced into the catalyst during the previous treatment. It is, however, essential to the success of the present process that both soaking in an aqueous solution of an alkali metal compound having a pH above 10, and preferably in the range of 12 to 15, and subsequent removal of the alkali metal introduced into the catalyst be carried out to reactivate the spent siliceous cracking catalyst.

The monovalent non-metallic ion solutions employed as base exchange media for effecting removal of the alkali metal introduced into the catalyst include various electrolytes and particularly ionizable acid and ammonium compounds. Thus, it is contemplated that inorganic or organic acids may be generally used. As a practical matter, however, where an acid is employed to remove the base-exchangeable alkali metal, a mineral acid is preferred. In addition to acids, various ammonium salts may be used, such as ammonium sulfate, ammonium chloride, and ammonium nitrate. Again, while a variety of ammonium salt solutions may be used, it is preferred to employ the ammonium salts of mineral acids. Acids and ammonium salts may be used in concentrations up to about 20 percent by weight although solutions of about 5 to 10 percent by weight have proved preferable. The extent of base exchange may vary over a period of from 1 to 72 hours. This latter period will depend primarily on the amount of introduced alkali metal and will be of sufficient duration so as to remove essentially all of the alkali metal from the reactivated catalyst. In general, it is desirable that the reactivated catalyst have an alkali metal content not exceeding about 0.2% and preferably less than 0.1%.

While sodium hydroxide solutions are preferred for treatment of the deactivated cracking catalyst, ionizable alkaline alkali metal compounds of concentration sufficient to afford a pH of at least 10 and preferably 12 to 15 generally may be used for this purpose and particularly the hydroxides or silicates of any of the alkali metals may be so employed.

I claim:

1. A method for reactivating a deactivated siliceous hydrocarbon conversion catalyst, comprising soaking the deactivated catalyst for a period of at least about 1 hour in a solution of an ionizable alkaline alkali metal compound having a pH of at least 10, removing the catalyst from contact with the soaking solution, water-washing the catalyst free of said solution, removing the alkali metal so introduced into said catalyst by base-exchange with an aqueous solution selected from the group consisting of solutions of an acid and an ammonium salt, washing the catalyst free of said solution and subjecting the catalyst to steam treatment at a temperature in the range of about 800° F. to about 1500° F. for a period of at least about 2 hours.

2. A method for reactivating a deactivated siliceous hydrocarbon conversion catalyst, comprising soaking the deactivated catalyst for a period of at least about 1 hour in an aqueous solution containing from about 1 to about 25 percent by weight of alkali metal hydroxide, removing the catalyst from contact with the soaking solution, water-washing the catalyst free of said solution, removing the alkali metal so introduced into said catalyst by base-exchange with an aqueous solution of a compound selected from the group consisting of an acid and an ammonium salt, washing the catalyst free of said solution, and subjecting the catalyst to steam treatment at a temperature in the range of about 800° F. to about 1500° F. for a period of at least about 2 hours.

3. A method for reactivating a deactivated silica-alumina cracking catalyst, comprising soaking the deactivated catalyst for a period of at least about 3 hours in an aqueous solution containing from about 1 to about 25 percent by weight of sodium hydroxide, removing the catalyst from contact with the soaking solution, water-washing the catalyst free of said solution, removing the sodium so introduced into said catalyst by base-exchange with an aqueous solution of an ammonium salt and subjecting the catalyst to steam treatment at a temperature in the range of about 1000° F. to about 1300° F. for a period of between about 2 and about 48 hours.

4. A method for reactivating a deactivated siliceous hydrocarbon conversion catalyst, comprising soaking the deactivated catalyst for a period of at least about 1 hour in a solution of an ionizable alkaline alkali metal compound having a pH of at least 10, removing the catalyst from contact with the soaking solution, removing the alkali metal so introduced into the catalyst by base-exchange with an aqueous solution containing ions selected from the group consisting of hydrogen and ammonium ions, washing the catalyst free of said solution, and subjecting the catalyst to steam treatment at a temperature in the range of about 1000° F. to about 1300° F. for a period of between 2 and 48 hours.

5. A method for reactivating a deactivated siliceous hydrocarbon conversion catalyst, comprising soaking the deactivated catalyst for a period of at least about 24 hours in an aqueous solution containing from about 1 percent to about 25 percent by weight of sodium hydroxide, removing the catalyst from contact with the soaking solution, water-washing the catalyst free of said solution, removing sodium so introduced into said catalyst by treatment with an aqueous ammonium salt solution, washing the catalyst free of said ammonium salt solution, and subjecting the catalyst to steam treatment at a temperature in the range of about 800° F. to about 1500° F. for a period of at least about 2 hours.

6. A method for reactivating a deactivated silica-alumina cracking catalyst, comprising soaking the deactivated catalyst for a period of at least about 24 hours in an aqueous solution containing from about 1 percent to about 25 percent by weight of sodium hydroxide, removing the catalyst from contact with the soaking solution, water-washing the catalyst free of said solution, removing the sodium so introduced into said catalyst by base-exchange with an aqueous ammonium mineral acid salt solution, washing the catalyst free of said ammonium salt solution and subjecting the catalyst to steam treatment at a temperature in the range of about 1100° F. to about 1200° F. for about 24 hours.

References Cited in the file of this patent

UNITED STATES PATENTS

| | | |
|---|---|---|
| 2,480,627 | Bodkin et al. | Aug. 20, 1949 |
| 2,684,340 | Baral et al. | July 20, 1954 |